United States Patent [19]
Watanabe

[11] Patent Number: 5,659,651
[45] Date of Patent: Aug. 19, 1997

[54] SUBMARINE REPEATER STRUCTURE

[75] Inventor: Osamu Watanabe, Tokyo, Japan

[73] Assignee: NEC Corporation, Tokyo, Japan

[21] Appl. No.: 612,273

[22] Filed: Mar. 7, 1996

[30] Foreign Application Priority Data

Mar. 8, 1995 [JP] Japan .................................. 7-048365

[51] Int. Cl.⁶ .................. G02B 6/00; H02G 3/00
[52] U.S. Cl. ................ 385/138; 385/12; 385/100; 385/101; 385/134; 174/705
[58] Field of Search ..................... 385/12, 13, 27, 385/31, 49, 56, 70, 86, 88, 100, 101, 138, 134; 250/227.18, 227.14, 231.19; 73/700, 705, 714, 754; 174/68.1, 70 R, 70 S

[56] References Cited

U.S. PATENT DOCUMENTS

| | | | |
|---|---|---|---|
| 4,283,114 | 8/1981 | Wandrack | 385/12 X |
| 4,505,540 | 3/1985 | Furusawa et al. | 385/138 X |
| 4,598,290 | 7/1986 | Collins et al. | 385/138 X |
| 4,648,082 | 3/1987 | Savit | 367/149 |
| 4,717,232 | 1/1988 | Priaroggia | 385/138 X |
| 4,799,752 | 1/1989 | Carome | 385/12 X |
| 5,131,062 | 7/1992 | Eide et al. | 385/12 |
| 5,345,522 | 9/1994 | Vali et al. | 385/24 |

*Primary Examiner*—Brian Healy
*Attorney, Agent, or Firm*—Scully, Scott, Murphy & Presser

[57] ABSTRACT

Disclosed is a submarine repeater structure which has: a cylindrical pressure-tight case in which an electronic circuit is accommodated and sealed; a connecting ring for connecting a terminal portion of a submarine cable; an ocean observation instrument for detecting a variation of frequency difference between a pressure-sensitive crystal and a reference crystal to measure a pressure; and a case for accommodating and sealing the ocean observation instrument; wherein the accommodating and sealing case is attached to an end portion inside the connecting ring.

11 Claims, 2 Drawing Sheets

SUBMARINE REPEATER STRUCTURE

FIELD OF THE INVENTION

This invention relates to a submarine repeater structure, and more particularly to, a submarine repeater structure for ocean observation.

BACKGROUND OF THE INVENTION

A conventional submarine repeater structure for ocean observation has a structure which comprises a pressure gauge which determines an external pressure by detecting a frequency difference between a pressure-sensitive crystal and a reference crystal. In general, the pressure-sensitive crystal is disposed on the side of sea water, and the reference crystal is disposed in a pressure tight box to be separated from the pressure-sensitive crystal.

However, in the conventional submarine repeater structure, there is a problem that a precise measurement of pressure may be not always obtained since the two crystals are disposed in the respective positions with different temperature conditions. In particular, the frequency of the reference crystal in the pressure-tight box tends to be varied due to the thermal affection by the thermogenesis of electronic circuit.

SUMMARY OF THE INVENTION

Accordingly, it is an object of the invention to provide a submarine repeater structure in which a precise measurement of pressure is always obtained.

According to the invention, a submarine repeater structure, comprises:

a cylindrical pressure-tight case in which an electronic circuit is accommodated and sealed;

a connecting ring for connecting a terminal portion of a submarine cable;

an ocean observation instrument for detecting a variation of frequency difference between a pressure-sensitive crystal and a reference crystal to measure a pressure; and a case for accommodating and sealing the ocean observation instrument; wherein the accommodating and sealing case is attached to an end portion inside the connecting ring.

According to another aspect of the invention, a submarine repeater structure comprises an ocean observation instrument, wherein:

the ocean observation instrument is provided inside a connecting ring composing the submarine repeater structure.

BRIEF DESCRIPTION OF THE DRAWINGS

The invention will be explained in more detail in conjunction with the appended drawings, wherein.

DESCRIPTION OF THE PREFERRED EMBODIMENTS

Before explaining a submarine repeater structure in the preferred embodiment, the aforementioned conventional submarine repeater structure will be explained in FIG. 1.

Figure 1:
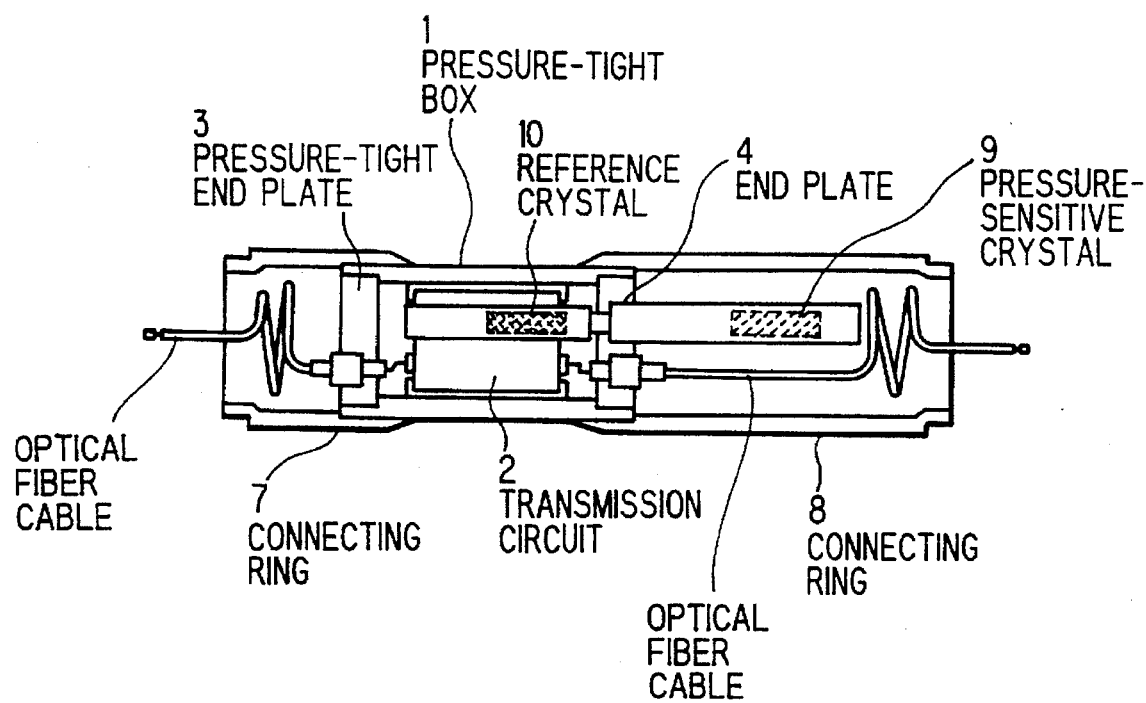
FIG. 1 is a longitudinal sectional view showing a conventional submarine repeater structure.

The conventional submarine repeater structure for ocean observation has a structure such as shown in FIG. 1. It comprises a pressure gauge which determines an external pressure by detecting a frequency difference between a pressure-sensitive crystal 9 and a reference crystal 10. The pressure-sensitive crystal 9 is disposed on the side of sea water through an end plate 4 of a pressure-tightbox 1, and the reference crystal 10 is disposed (on the side of an electronic circuit) in the box 1 through a pressure-tight box end plate 3. Also provided on both ends are connecting rings 7 and 8 for connecting with terminal portions(not shown) of a submarine cable.

Next, a submarine repeater structure in the preferred embodiment will be explained in FIGS. 2 to 3, wherein like parts are indicated by like reference numerals as used in FIG. 1.

Figure 2:
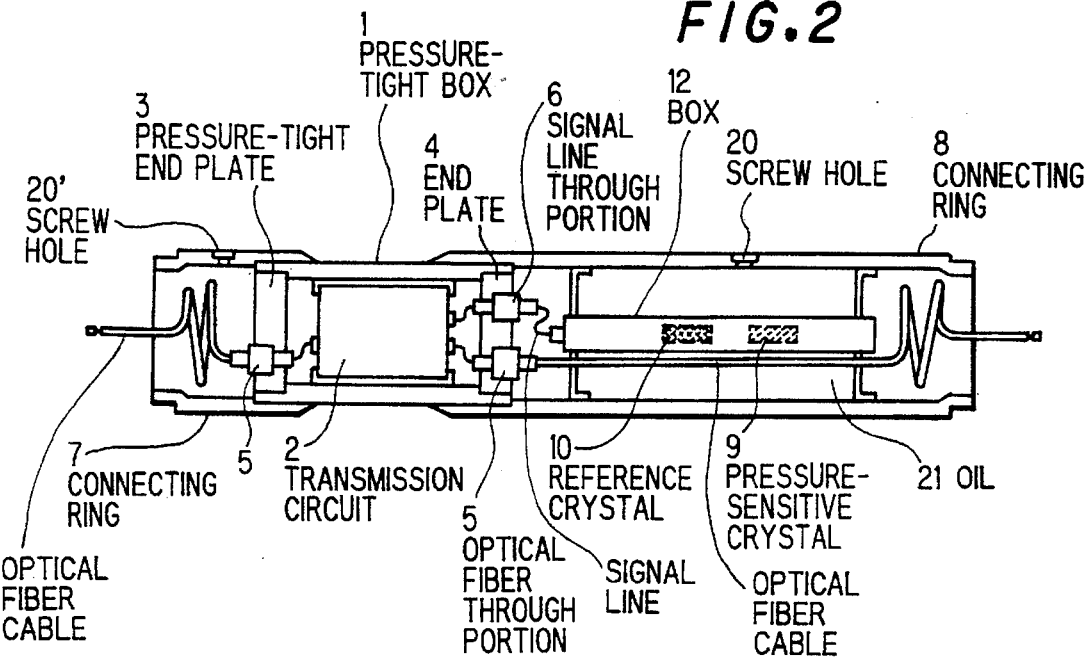
FIG. 2 is a longitudinal sectional view showing a submarine repeater structure in a preferred embodiment according to the invention.

As show in FIG. 2, a transmission circuit 2 which includes a modulator circuit and an amplifier circuit is fixedly accommodated inside the pressure-tight box 1. At one end of the pressure-tight box 1 an end plate 3 is provided, and at the other end an end plate 4 is provided by airtight welding. The end plate 3 is provided with an optical fiber through portion 5, and the end plate 4 is provided with an optical fiber through portion 5 and a signal line through portion 6. The pressure-tight box 1 is also provided with connecting rings 7 and 8.

On the other hand, a pressure-sensitive crystal 9 and a reference crystal 10 are accommodated in a small box 12.

Figure 3:
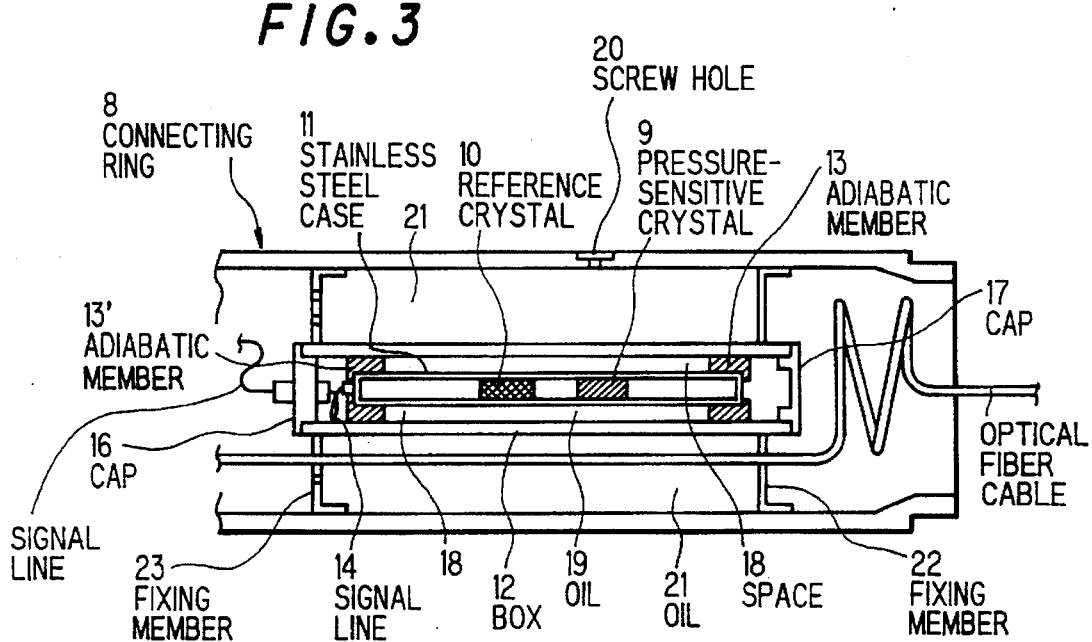
FIG. 3 is an enlarged detail sectional view in FIG. 2.

FIG. 3 shows the detail of the small box 12. Referring to FIG. 3, a stainless steel case 11 is fixed An the small box 12 which is made of beryllium through adiabatic members 13 and 13' which is made of plastics etc. After connecting a signal line 14 with an outgoing line, a cap 16 made of beryllium is attached to one end of the box 12. To the other end of the box 12 a cap 17 made of rubber is attached. Space 18 between the metallic case 11 and the box 12 is filled with oil 19 with a small thermal conductivity. The box 12 is fixed in the connecting ring 8 through fixing members 22 and 23 made of beryllium. The fixing members 22 and 23 are screwed to the connecting ring 8 and have a plurality of holes through which oil can move. After the connecting ring 8 is connected with a terminal portion (not shown) of a submarine cable, oil with a small thermal conductivity is introduced inside through a hole 20 which is provided on the connecting ring 8, similarly, the oil is filled inside the connecting ring 7.

In operation, the pressure of sea water is first transmitted to the rubber cap 17 through the oil 21. The pressure from the rubber cap 17 is next supplied to the reference crystal 10 and the pressure-sensitive crystal 9 to measure the pressure. Herein, since the oil 21 can move in the connecting ring 8 through the holes of the fixing members 22 and 23, the pressure of sea water can be sufficiently transmitted. Also, the oil 19 can move inside such that the pressure from the rubber cap 17 is sufficiently transmitted to the oil 19. Due to the filling of the oil 21, the surrounding temperature condition can be equalized between the reference crystal 10 and the pressure-sensitive crystal 9 to always obtain a precise measurement data.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A submarine repeater structure, comprising:

an electronic circuit which includes an amplifier, said electronic circuit having an input and an output connected to a submarine cable;

a cylindrical pressure-tight case in which said electronic circuit is accommodated and sealed;

a connecting ring for connecting a terminal portion of said submarine cable to said repeater structure;

an ocean pressure detecting instrument for detecting a variation of frequency difference between a pressure-sensitive crystal and a reference crystal to measure a pressure; and a case for accommodating and sealing said ocean pressure detecting instrument;

wherein said accommodating and sealing case is attached to an end portion inside said connecting ring.

2. A submarine repeater structure, according to claim 1, wherein:

said accommodating and sealing case is filled with oil with a small thermal conductivity.

3. A submarine repeater structure, comprising:

an electronic circuit which includes an amplifier;

input and output connecting means connected to an input and an output of said electronic circuit, respectively; and an ocean pressure detecting instrument connected to said electronic circuit, wherein said ocean pressure detecting instrument is provided inside a connecting ring of said submarine repeater structure and has a first case located within a second case, said first and second cases being separated by a thermally insulating material.

4. A submarine repeater structure, according to claim 3, wherein:

said ocean pressure detecting instrument comprises a pressure gauge including a pressure-sensitive crystal and a reference crystal.

5. A submarine repeater structure, comprising:

an electronic circuit which includes an amplifier;

input and output connecting means connected to an input and an output of said electronic circuit, respectively; and an ocean pressure detecting instrument connected to said electronic circuit, wherein said ocean pressure detecting instrument is provided inside a connecting ring of said submarine repeater structure and comprises a first case, a second case for accommodating said first case, and oil which has a small thermal conductivity and is filled in a space between said first and second cases.

6. A submarine repeater structure, according to claim 5, wherein:

a heat-insulating member is inserted between said first and second case.

7. A submarine repeater structure, according to claim 5, wherein:

said pressure-sensitive crystal and said reference crystal are accommodated in said first case.

8. A submarine repeater structure, according to claim 5 further comprising a flexible cap which is attached to one end of said second case, said flexible cap transmitting a pressure of sea water therein.

9. A submarine repeater structure, according to claim 7, wherein:

oil with a small thermal conductivity is movably filled in space between said ocean pressure detecting instrument and said connecting ring.

10. A submarine repeater structure, according to claim 1, wherein said electronic circuit further includes a modulator.

11. A submarine repeater structure, according to claim 3, wherein said electronic circuit further includes a modulator.

* * * * *